Dec. 12, 1939.     R. R. R. SARAZIN     2,183,467
DEVICE FOR BALANCING ALTERNATING MACHINES
Filed Jan. 21, 1938
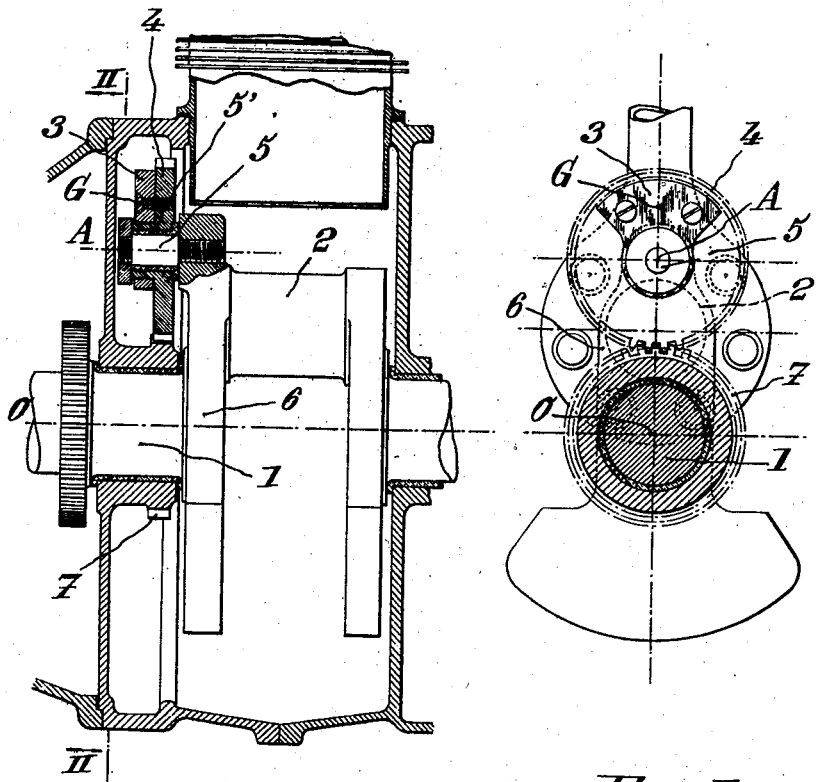
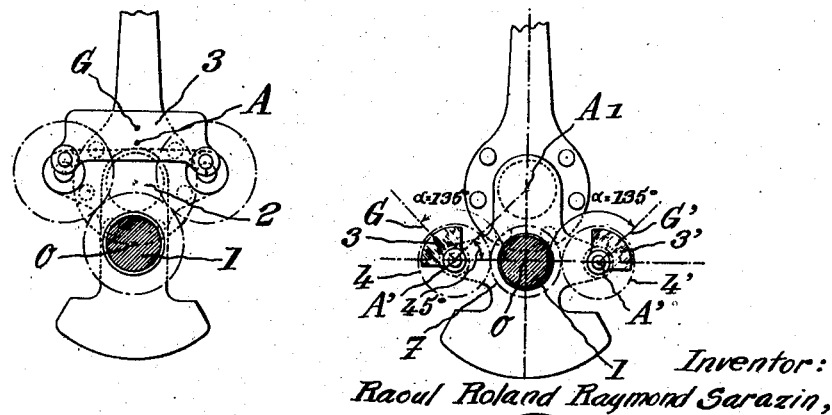
Inventor:
Raoul Roland Raymond Sarazin,
Attorneys Patented Dec. 12, 1939

2,183,467

UNITED STATES PATENT OFFICE 2,183,467

DEVICE FOR BALANCING ALTERNATING MACHINES

Raoul Roland Raymond Sarazin, Saint-Prix, France

Application January 21, 1938, Serial No. 186,258
In Luxemburg September 24, 1937

7 Claims. (Cl. 74—604)

The present invention relates to devices for balancing alternating machines, and especially engines, the cylinders of which are arranged radially, forming one or several banks, and the system of connecting rods of which includes at least one master connecting rod having a head to which the heads of auxiliary connecting rods are pivotally connected about axes distinct from the axis of the crank pin.

The essential object of the present invention is to provide a device of this kind which is capable of balancing in a more satisfactory manner than it has been possible to do up to this time the perturbing forces or torques which are developed, when the machine is running, as a consequence of the fact that the axis of the crank pin (or crank pins) of said machines is distinct from the axis of the auxiliary connecting rods coacting with said crank pin.

According to an essential feature of the present invention, the crankshaft of the machine to be balanced is provided with an eccentric system corresponding or equivalent to one mass the center of gravity of which can be given a rotary movement in the same direction and at the same speed as said crankshaft, about an axis which is fixed with respect to said crankshaft and parallel to the axis of revolution thereof (or even in coincidence with said axis in some cases), this mass being mounted in a relative position such that, when the crank pin on which act the perturbing effects to be compensated passes through its extreme upper position, the center of gravity of said mass is at the maximum distance from the axis of revolution of said crankshaft, in the direction of said upper position.

Other features of the present invention will result from the following detailed description of some specific embodiments thereof.

Preferred embodiments of the present invention will be hereinafter described, with reference to the accompanying drawing, given merely by way of example, and in which:

Fig. 1 is a side elevational view, partly in axial section of an internal combustion engine including a single bank of cylinders, provided with a balancing device made according to a first embodiment of the present invention;

Fig. 2 is a sectional view on the line II—II of Fig. 1;

Fig. 3 is a diagrammatical view showing a modification;

Fig. 4 shows, in a diagrammatical manner on a smaller scale and in front view, the connecting rod system of a radial engine provided with a balancing device made according to a second embodiment of the present invention.

In the case of a radial engine including at least one master connecting rod having a head to which a plurality of auxiliary connecting rods are pivoted about axes parallel to, but distinct from, the axis of the crank pin, the chief perturbing factors are, on the one hand, a radial force F, turning about the driving shaft, with respect to the frame, with a speed equal to twice the speed of revolution N of the crankshaft, and, on the other hand, a periodical vibratory torque C of a frequency equal to N and the axis of which coincides with that of said crankshaft.

According to the present invention, these perturbing actions are compensated in the following manner:

The crankshaft 1 of this engine is provided with at least one eccentric system, consisting of, or equivalent to, a mass the center of gravity of which can be given a rotary movement about an axis A fixed with respect to the crankshaft and extending in a direction parallel to the axis of revolution O of the crankshaft. This mass is mounted in such manner that when crank pin 2, on which act the perturbing actions, is at its outer dead center (that is, as shown by Fig. 1, when the piston connected thereto is farthest from the axis of the crankshaft) the center of gravity G of said mass is at the maximum distance from the axis O of the crankshaft, in the direction of said upper position of the crank pin.

According to a first embodiment of the invention, the eccentric system above referred to may consist of a single mass 3.

In this case, according to a first modification, illustrated by Fig. 1 and Fig. 2, the whole of said mass may turn about axis A;

Or, according to a second modification, illustrated by Fig. 3, this mass 3 is so arranged as to move always parallel to itself, that is to say in such manner that all of its points describe circles of the same radius as that along which the center of gravity G of said mass is moving about axis A. In other words, in this modification, the movement of mass 3 can be considered as equivalent to that of the mass of a bifilar pendulum the suspension wires of which would turn with a continuous rotary movement instead of having a mere oscillatory movement.

In any case, the axis A about which the rotary movement of mass 3 is taking place must be located in the plane of the axis O of the crankshaft 1 and of the axis of the crank pin 2 and on the same side of axis O as the axis of said crank pin.

If the first of these modifications is chosen (and it will be the only one described in detail by way of example) it is advantageous to make use of the specific arrangement illustrated by Fig. 1 and Fig. 2.

In this example, mass 3 is fixed to the side of a pinion 4 journalled on a shaft element 5 carried by an extension of one of the flanges 6 of crankshaft 1, a ring 5′ being advantageously interposed between shaft element 5 and pinion 4.

This pinion is caused to coact with a stationary pinion 7, of the same diameter, disposed coaxially with crankshaft 1, this stationary pinion being eventually rigid with the outer ring of the bearing which supports the crankshaft.

This mass 3 is positioned, according to the main feature of the present invention, as above stated, that its center of gravity G passes through its upper dead center at the same time as crank pin 2 and is, at this time, at the maximum distance from the axis O of the crankshaft.

Calculation shows that in order to have mass 3 exactly compensating both torque C and force F, it would be necessary to dispose axis A in coincidence with the axis of the crank pin 2, the importance of said mass, same as the eccentricity of its center of gravity, depending of course upon the intensity of force F.

However, it is possible to compensate the perturbing effects in a practically sufficient manner by placing these two axes at a relatively small distance from each other, which is very advantageous from a constructive point of view, since the diameter of pinion 7 cannot be given any arbitrary value as a consequence of the fact that this pinion is to be mounted coaxially with crankshaft 1.

I can then calculate the elements in such manner as to distribute evenly between the compensation of the force and that of the torque the theoretical error resulting from the fact that axis A does not coincide with the axis of the crank pin.

As above explained, these remarks apply as well to the modification of Fig. 3 as to that of Figs. 1 and 2.

But I can also, according to another embodiment of the invention, an example of which is illustrated by Fig. 4 for a particular case, constitute the eccentric system no longer of a single mass, but of a plurality of masses turning in synchronism about axes A′, respectively, parallel to the axis of revolution of the crankshaft, said masses being devised in such manner that their action on the crankshaft is equivalent to that of the single mass above referred to.

Owing to this arrangement, it will be readily understood that said respective axes A′ may be positioned where it is desired, which, as above explained, was not always possible for axis A in the case of a single compensating mass.

For instance, I may, as shown in a diagrammatic manner by Fig. 4, make use of the following arrangement:

There are two masses 3 and 3′, suitably chosen, turning about axes A′ carried by extensions of the crankshaft 1 and located in a plane passing through axis O and at right angles to line OA₁ (A₁ being the axis of crank pin 2).

These two masses 3 and 3′ are caused to rotate by two pinions 4 and 4′ coacting with a stationary pinion 7, of the same diameter;

These masses 3 and 3′ are given relative positions such that, when crank pin 2 passes through its upper dead center, said masses are located symmetrically with reference to plane OA₁, their centers of gravity G and G′ being respectively located each on a radius making an angle of 135° approximately with the line A′—A′ (this angle of 135° corresponding to the theoretical case in which axis A₁ does coincide with the axis of the crank pin).

Such an eccentric system is then equivalent to the single mass above described, which means that it ensures compensation of the perturbing actions of both force F and torque C.

It should be noted that it is not necessary that line A′—A′ should pass through center O. This line might be located at a distance from said center and, in particular, it might be located at a shorter distance from the axis A₁ of the crank pin, or, on the contrary, below axis O.

Calculation shows that, in this case, if it is desired to keep the angular relation at about 135° of the centers of gravity G and G′, the axes A′ should be displaced along lines at 45° to line A₁O and passing through point A₁, the limit position, in which both of the axes A′ coincide with axis A₁, corresponding to a single mass 3 pivoted about the axis A of the crank pin, as mentioned in the case of the first embodiment, above described.

It is therefore necessary, when the plane of axes A′ is brought nearer to the axis of the crank pin, to vary the relative angular position of the centers of gravity of masses 3 and 3′, in such manner as to compensate for the variations of compensating effect due to the fact that said axes A′ are not located on lines at 45° passing through the axis of the crank pin.

Calculation then permits of determining the relative angular position of masses 3 and 3′ as a function of the eccentricity of line A′—A′.

I might even, in some cases, be led to placing the line of the axes of rotation A′ of masses 3 and 3′ on the other side of axis O from the axis of the crank pin, the relative positions to be given to the centers of gravity of said masses being still determined by the same formula if points A′ (projections of axes A′ on a perpendicular plane) are chosen otherwise than on lines at 45° passing through the axis of crank pin 2.

It can be stated, in a general manner, that, as the line of the pivoting axes A′ is being moved downwardly below axis A₁, angle α is to be increased, this angle ranging always between 90° and 180°.

I thus obtain, whatever be the specific embodiment that is chosen, a balancing device which is particularly simple and efficient and which is applicable to many cases.

The eccentric systems above mentioned were intended to compensate both the action of force F and that of torque C. If it is desired to compensate merely force F, calculation shows that it is advantageous to make use of an arrangement differing from that of Fig. 4 merely by the relative angular positioning of centers of gravity G and G′, which is such that angle α is equal to 90°, exactly, instead of 135° as in the above described embodiment.

Of course, the mechanisms for driving the compensating masses are not necessarily those above described.

On the other hand, in the case of radial engines including two parallel banks of cylinders, I would provide several eccentric systems such as those above described, those systems being of course disposed in angular relative position of 180° with respect to each other.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the accompanying claims.

What I claim is:

1. In an engine having at least one bank of cylinders, a crankshaft having at least one crank pin and at least one master connecting rod journalled on said crank pin, in the operation of which are developed a force radial to said crankshaft and turning around the axis thereof at a speed equal to twice the speed of rotation of the crankshaft and a vibratory torque of a frequency equal to the speed of revolution of the crankshaft, balancing means for said force and torque comprising at least one member carried by said crankshaft for rotation therewith and having its axis parallel to and eccentric to the axis of the crankshaft, weight means mounted to rotate eccentrically about the axis of said member, and means to rotate said weight means continuously about the axis of said member at a speed equal to the speed of rotation of the crankshaft and in the same direction as said crank shaft, so as to produce a continuous force in a direction which rotates at the same speed as the speed of rotation of the crankshaft about an axis located on the same side of the crankshaft axis as the crank pin and which is directed radially outwardly from the axis of the crankshaft when the crank pin is in its outer dead center position.

2. In an engine having at least one bank of cylinders, a crankshaft having at least one crank pin and at least one master connecting rod journalled on said crank pin, in the operation of which are developed a force radial to said crankshaft and turning around the axis thereof at a speed equal to twice the speed of rotation of the crankshaft and a vibratory torque of a frequency equal to the speed of revolution of the crankshaft, balancing means for said force and torque comprising at least one member carried by said crankshaft for rotation therewith and having its axis parallel to and eccentric to the axis of the crankshaft and in alignment with the axis of the crankshaft and crankpin on the same side of the crankshaft axis as the crankpin, a single weight means mounted to rotate eccentrically about the axis of said member, and means to rotate said weight means continuously about the axis of said member at a speed equal to the speed of rotation of the crankshaft and in the same direction as said crankshaft, so as to produce a continuous force in a direction which rotates at the same speed as the speed of rotation of the crankshaft about an axis located on the same side of the crankshaft axis as the crank pin, said weight means being located furthest from the axis of the crankshaft when the crank pin is in its outer dead center position.

3. In an engine having at least one bank of cylinders, a crankshaft having at least one crank pin and at least one master connecting rod journalled on said crank pin, in the operation of which are developed a force radial to said crankshaft and turning around the axis thereof at a speed equal to twice the speed of rotation of the crankshaft and a vibratory torque of a frequency equal to the speed of revolution of the crankshaft, balancing means for said force and torque comprising at least one member carried by said crankshaft for rotation therewith, a single weight means, means mounting said weight for movement of its center of gravity in a circle with respect to said member, and for movement of each other point in a circle parallel to said first circle, and means to impart such movement to said weight means so that its center of gravity moves continuously in such circle at a speed equal to the speed of rotation of the crankshaft and in the same direction as said crankshaft, so as to produce a continuous force in a direction which rotates at the same speed as the speed of rotation of the crankshaft about an axis located on the same side of the crankshaft axis as the crank pin and which is directed radially outwardly from the axis of the crankshaft when the crank pin is in its outer dead center position.

4. In an engine having at least one bank of cylinders, a crankshaft having at least one crank pin and at least one master connecting rod journalled on said crank pin, in the operation of which are developed a force radial to said crankshaft and turning around the axis thereof at a speed equal to twice the speed of rotation of the crankshaft and a vibratory torque of a frequency equal to the speed of revolution of the crankshaft, balancing means for said force and torque comprising two members carried by said crankshaft and having their axes parallel to and eccentric to the axis of the crankshaft and located at equal distances from a plane containing the axes of the crankshaft and crankpin, two weight means mounted to rotate eccentrically about the axes of said members, and means to rotate said weight means continuously about the axes of said members at a speed equal to the speed of rotation of the crankshaft and in the same direction as said crankshaft, so as to produce a continuous force in a direction which rotates at the same speed as the speed of rotation of the crankshaft about an axis located on the same side of the crankshaft axis as the crank pin and which is directed radially outwardly from the axis of the crankshaft when the crank pin is in its outer dead center position.

5. A balancing device according to claim 4 in which said eccentric axes are located in the same plane at right angles to the first said plane and passing through the axis of said crankshaft, the radii to the centers of gravity of said weight means each making an angle of 135° with the common plane of their axes when said crankpin is in its outer dead center position.

6. A balancing device according to claim 4 in which said eccentric axes are located in the same plane at right angles to the first said plane, each of said last eccentric axes being further located in a plane passing through the axis of said crank pin and making an angle of 45° with the first said plane, the radii to the centers of gravity of said weight means each making an angle of 135° with the common plane of their axes when said crank pin is in its outer dead center position.

7. In an engine having at least one bank of cylinders, a crankshaft having at least one crank pin and at least one master connecting rod journalled on said crankpin, in the operation of which is developed at least a force radial to said crankshaft and turning around the axis thereof at a speed equal to twice the speed of rotation of the crankshaft, balancing means for said force comprising two members carried by said crankshaft and having their axes parallel to and eccentric to the axis of the crankshaft and located at equal distances from a plane containing the axes of the crankshaft and crankpin and in a plane at right angles to the first said plane and passing through the axis of said crankshaft, two weight means mounted to rotate eccentrically about the axes of said members, and means to rotate said weight means continuously about the axes of said members at a speed equal to the speed of rotation of the crankshaft and in the same direction as said crankshaft.

RAOUL ROLAND RAYMOND SARAZIN.